Sept. 20, 1932.  L. V. LUCIA  1,877,923
ELECTRIC SWITCH
Filed Nov. 29, 1929
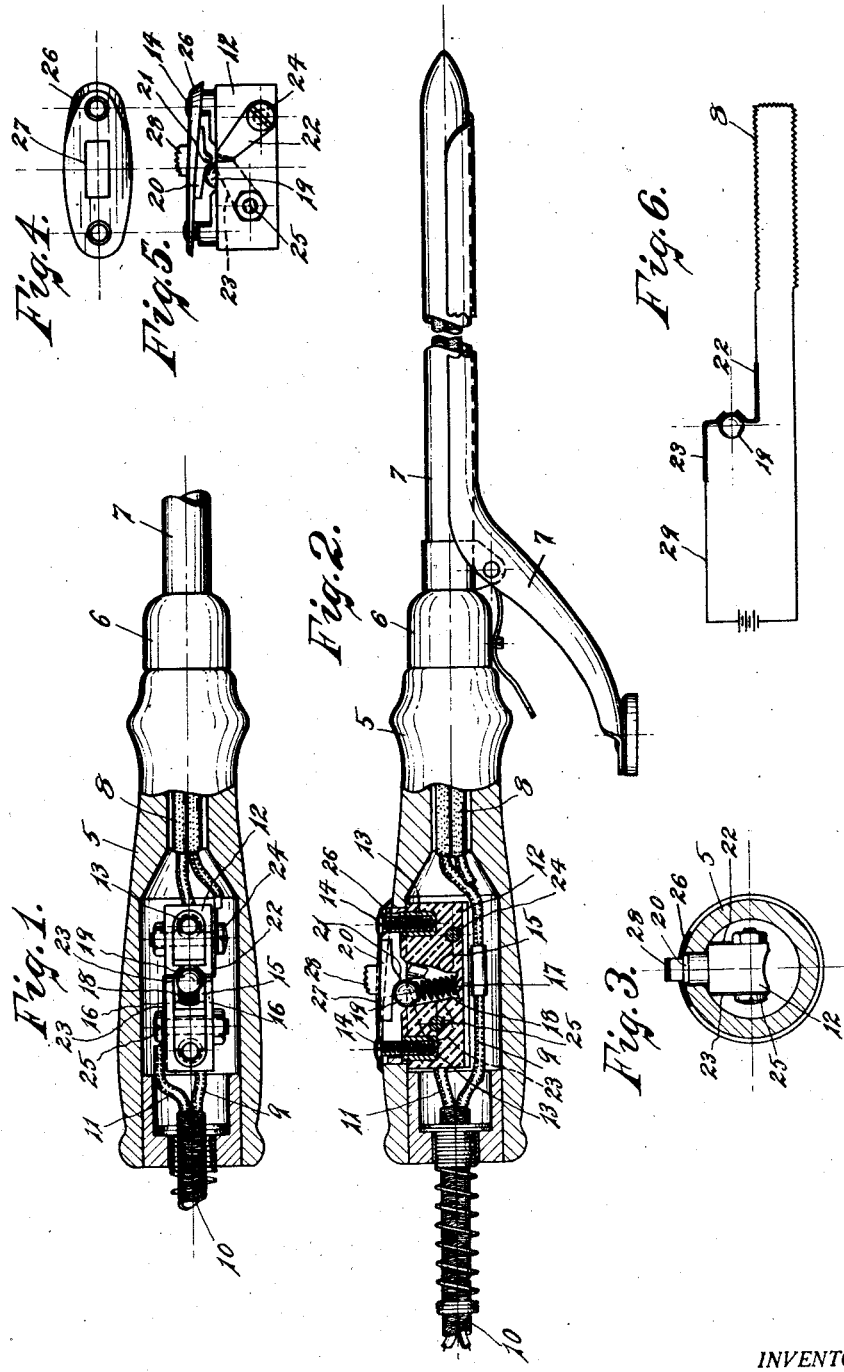
INVENTOR.
Louis V. Lucia
By H. G. Manning
ATTORNEY Patented Sept. 20, 1932

1,877,923

UNITED STATES PATENT OFFICE

LOUIS V. LUCIA, OF WATERBURY, CONNECTICUT, ASSIGNOR TO THE BEARDSLEY & WOLCOTT MFG. CO., A CORPORATION OF CONNECTICUT

ELECTRIC SWITCH

Application filed November 29, 1929. Serial No. 410,326.

This invention relates to electric snap switches.

It has for its object to provide a switch of the two pole type which is simple and economical in construction. A further object of my invention is to provide a switch which can be easily assembled either to a plate or to a tube from the inside.

Further objects of my invention are to provide a mechanism for such an improved switch which can be assembled without the use of machinery or special tools, each part being so designed that it can be readily put in place and the switch completely assembled at the time that it is fastened in its place.

A preferred form of my device is shown in the accompanying drawing which shows the same as used in connection with electric curling irons.

In this drawing,—

Figure 1 shows a plan view of the switch as assembled in a curling iron handle which is partly broken away to show construction.

Figure 2 shows a side view of the switch in cross section as assembled to the same handle.

Figure 3 is an end view in elevation of the switch, the handle being shown in cross section.

Figure 4 is a plan view of the top plate.

Figure 5 is a side elevation showing the switch completely assembled, but not attached.

Figure 6 is a diagrammatic view showing how the switch is used in connection with an electric heating device such as a curling iron.

In the drawing, the numeral 5 denotes a curling iron handle having a ferrule 6 mounted thereon, and the tube 7 inserted partly within said handle while a pivoted co-operating curling member 7' is operatively connected to co-operate with the tube and has a handle portion adjacent and operative from the handle 5 in a well known manner.

A heating element 8 is inserted within the tube 7. One end of this heating element is connected to one of the lead wires 9 extending from an electric cord 10. The other end of the element is connected to the switch, as is also the other lead wire 11.

The switch which comprises my invention is composed of a shell 12 which is made of an insulating material and preferably formed of a molded material such as bakelite. Threaded inserts 13 are molded within the said shell in position to engage the screws 14. The shell 12 is provided with a recess 15 and side walls 16. The bottom of said recess is raised in the center as at 17 to provide a rocking surface for the spring 18 which is mounted within the said recess. A ball 19 is mounted on top of the said spring and adapted to be engaged by an actuating slide cam 20. This slide cam has a point or raised boss which actuates the ball 19. Contacts 22 and 23 are fastened to the shell by means of contact screws 24 and 25. These contacts have projecting ears which are adapted to lie within the recess 15 of the shell and the said ears are so disposed in relation to each other as to form a seat to receive the ball 19. As shown in the drawing, the end of each contact lying within the recess 15 against angularly disposed walls at one end of the recess.

A plate 26 is located at the top of said shell by means of the screws 14 and this plate is adapted to position the cam 20 in sliding relation with the ball 19. The plate 26 has an opening 27 through which an actuating thumb piece 28 projects and in position wherein it may be readily actuated by the thumb.

As shown in Figure 6 the switch is interposed between the electric circuit 29 and an electric heating element 8. When the ball is in position between the two contact members, the circuit is closed, so that the current may flow through the said ball and energize the element. When the ball is moved away from this position the circuit is broken, as it will leave a gap between the two contacts.

The operation of the device is as follows:

The spring 18 is mounted on the raised bottom of the recess 15 in such a way that it can rock on the said bottom. This spring presses the ball 19 against the cam surface of the slide 20. The force on this ball tending to force it to the side of the recess opposite that in which the slide rests. When the slide 20 is actuated by contact with the thumb piece 28, it is forced against the ball tending to push the said ball down by means of the raised point 21 until the said point is passed beyond the center of the ball. At this time the ball will be snapped to the other side of the said slide, and at the same time it is forced against the opposite side of the recess 15.

When the ball is snapped to the side of the recess in which lie the ends of the contacts 22 and 23, the said ball presses against the ends of these contacts and thus closes an electric circuit.

It can be readily understood that by means of this construction the ball is caused to quickly make or break an electric circuit, thus minimizing the arcing which is caused by breaking the circuit and prolonging greatly the life of the contacts in the switch.

While I have in this application specifically described one form of device which my invention may assume, it is evident that the same may be constructed in other forms without departing from the spirit of the invention and it will be understood that it is my intention to include all such forms within the scope of the appended claims.

What I claim as new and desire to secure by Letters Patent is:—

1. In an electric snap switch, an insulating casing having a V-shaped recess, means at the apex of said recess providing a spring seat, a coiled spring resting on said seat, a circuit closing ball member seated on the free end of said coiled spring, and a slidable cam member for depressing said ball and then forcing it to the opposite end of its path.

2. In an electric snap switch, an insulating casing, a coiled spring having one end seated in said casing, a circuit closing ball member resting upon the free end of said coiled spring and adapted to swing between its circuit controlling positions, and a slidable switch actuating member provided with a cam on its lower surface for first depressing said closing member against the action of said spring and then forcing it to the opposite circuit controlling position.

3. In an electric snap switch, a coiled spring having one end stationary, the free end of said spring being mounted to swing within a predetermined arc, a circuit controlling ball member seated on the free end of said spring and adapted to be moved thereby between the open circuit and closed circuit positions, and a slidable member having a central V-shaped cam on its lower surface for first depressing said circuit closing member against the action of said spring and then forcing it to the opposite circuit controlling position.

4. In an electric snap switch, a coiled spring having one end stationary, the free end of said spring being mounted to swing within a predetermined arc, a circuit controlling ball-shaped member seated on the free end of said spring and adapted to be moved thereby between the open circuit and closed circuit positions, and a slidable member having a central needle bar cam on its lower surface for first depressing said circuit closing member against the action of said spring and then forcing it to the opposite circuit controlling position.

In testimony whereof I affix my signature.

LOUIS V. LUCIA.